June 2, 1964     O. J. BRATZ     3,135,132

PUSH-PULL CABLE

Filed April 18, 1961

INVENTOR
Otto J. Bratz
BY
ATTORNEYS

United States Patent Office 3,135,132
Patented June 2, 1964

3,135,132
PUSH-PULL CABLE
Otto J. Bratz, Adrian, Mich., assignor to American Chain & Cable Company, Inc., New York, N.Y., a corporation of New York
Filed Apr. 18, 1961, Ser. No. 103,747
3 Claims. (Cl. 74—501)

This invention relates to push-pull cables and in particular to a ball-bearing push-pull cable having a casing formed from a multiplicity of helically disposed strands which are bound together side-by-side in tubular form.

In general, the improvement in the new push-pull cable design is based upon an economical and highly effective cable casing or housing constructed by helically wrapping together a multiplicity of strands side-by-side and binding them in place by means of a flexible exterior element. Preferably, this is done on a mandrel and the exterior binding element is swaged against the strands. When the bound strands are removed from the mandrel they retain their tubular form and a self-supporting casing results which is especially suited for use in push-pull cables. Such a tubular casing does not rely upon any particular cross sectional configuration of the individual strands to be self-supporting because the helical disposition of the strands and the substantially radial forces exerted thereon by the exterior binding prevent the strands from being displaced out of their tubular form. It is particularly contemplated by the invention that the strands be wrapped in a helix of relatively long pitch or lay in order to provide a sound self-supporting tubular structure.

One of the most important features of the new push-pull cable casing is that it can be bent in any direction during operation and still function satisfactorily. Because of the helical arrangement of the strands in the casing, it possesses good flexibility and thus can be made to assume various curved shapes with little effort. Even more significantly, however, when the casing is bent into a curved shape its neutral axis does not undergo critical lateral displacement. This is of particularly great importance in a ball-bearing push-pull cable because the axially movable core element should coincide with the neutral axis of the casing for proper bearing action and it cannot do so if the neutral axis is not coincidental with the geometric axis.

On the inside surface of the casing, the extended helical junctions between adjoining pairs of the strands provide highly satisfactory races for bearing balls disposed about a central core element. Adjoining pairs of most wires, such as those of round cross section, define a valley between them and such valleys provide the races in the new casing. Hence, the new casing eliminates the need for separate race elements. Also, the helical disposition of the races formed by the valleys between adjoining pairs of the strands imparts a novel turning motion to the bearing cages as they move axially within the cable. The bearing balls therefore move helically when the core element is displaced and their overall longitudinal displacement is less for a given displacement of the core element that it would if they were made to roll in a straight line longitudinally.

Broadly stated, the invention provides in a push-pull cable a novel tubular casing which comprises a multiplicity of strands helically disposed side-by-side throughout their length. Such strands together form an inner tubular element. At least one flexible element is also included which is bound tightly about the outside surface of the inner tubular element to hold the strands together. Advantageously, the helically disposed strands have a lay at least fifteen times greater than the outer diameter of the inner tubular element. Adjoining pairs of such strands may define a plurality of helical bearing races formed throughout the length of the inside surface of the inner tubular element.

The invention also provides a push-pull cable comprising a tubular casing and a core element extending substantially axially therethrough. A plurality of bearing races extend through the casing and are spaced substantially uniformly from the core element. A plurality of bearing balls are disposed between and are in rolling engagement with the core element and the races. Also, a plurality of separate cages are included, each locating several of the bearing balls in spaced relation about the core element. The combination of this cable with the above-described tubular casing is also provided by the invention.

A preferred embodiment of the invention is described hereinbelow with reference to the accompanying drawing, wherein FIG. 1 is a fragmentary elevation partly broken away of the end portion of the new push-pull cable;

Figure 1:
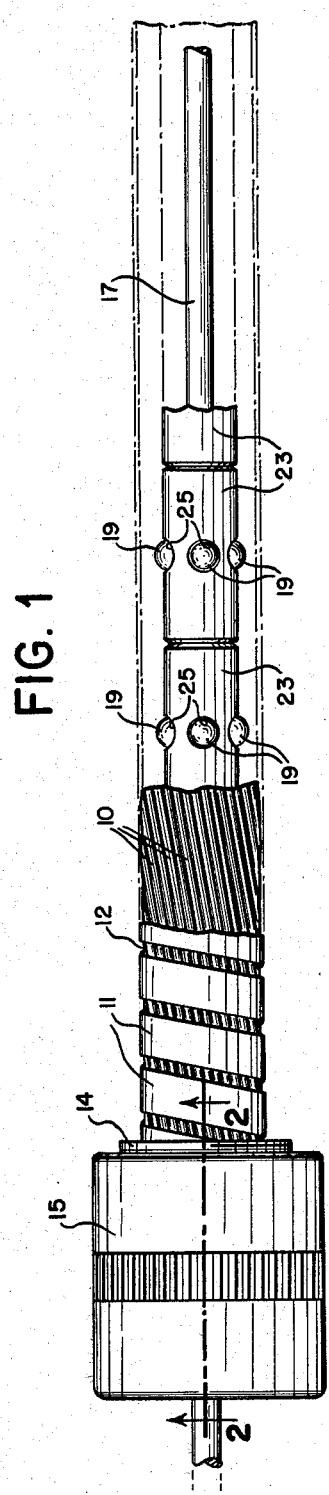
Figure 3:
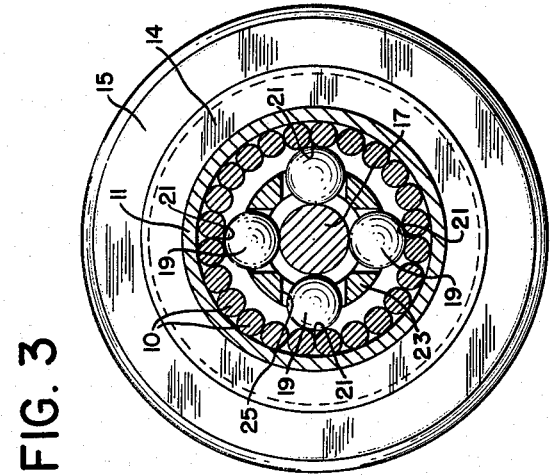
FIG. 3 is an enlarged section taken along the line 3—3 of FIG. 2.

The new casing is made up of a multiplicity of round wires 10 held in place by an outer flexible metal strip 11. In a preferred method of fabrication, the wires 10 are originally straight (i.e. not pre-formed into helical configuration) and they are wrapped side-by-side about a mandrel in a helical form having a lay at least fifteen times greater than the outer diameter of the wrapping. The strip 11 is then applied tightly about the wires in helical turns of a lesser lay and a space 12 is left between the turns of the strip 11. Before the assembly is removed from the mandrel, the strip 11 is continuously swaged against the wires 10 to insure that it binds them firmly. When the bound wires are removed (and they may be withdrawn continuously from the mandrel) a self-supporting tubular structure results.

Any suitable end fitting may be provided on the opposite ends of the casing. That shown is an externally threaded collar 14 crimped about the strip 11 at the cable end portion and an internally threaded cap 15 screwed on the collar. A central circular opening 16 is provided in the outer end of the cap 15. Both ends of the cable may be equipped with such a fitting.

By this construction, a casing is provided which is a firmly self-supporting structure readily flexible in any direction. Because of the helical pitch of the wires 10, they remain held in their tubular form by the strip 11 regardless of the cross sectional shape of the wires. Hence, round wires may be employed and there is no need to incorporate trapezoidal strands which hold together only by the keystone principle. Because of the long lay of the wires 10 and the spacing 12 between the turns of the strip 11, the casing may be flexed without causing substantial lateral displacement of its neutral axis.

Extending substantially axially throughout the length of the casing is a core element 17 which may be a heavy flexible round wire possessing sufficient stiffness to transmit forces in compression without buckling. The core element 17 projects loosely through the opening 16 in the fittings 15 at each end of the casing. When the cable is installed, the core element 17 is linked to the appropriate actuator and driven member at its opposite ends.

Disposed in rolling engagement with the surface of the core element 17 are a multiplicity of bearing balls 19 having a diameter such that they are also in rolling engagement with the inside surface of the casing and thereby hold the core element axially within the cable. The inside surface of the casing is defined by a multiplicity of valleys between adjoining pairs of the helical wires 10, any of which valleys serve as races 21 in which the bearing balls 19 may roll. Hence, it is evident that the new casing also defines suitable bearing races of long pitch on its inside surface and eliminates the need for separate race elements in the cable.

Figure 2:
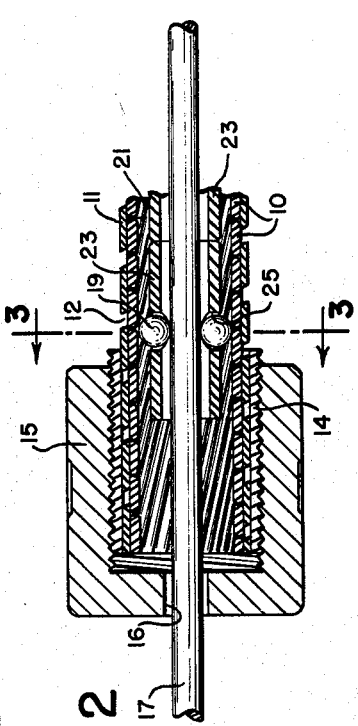
FIG. 2 is a section taken along the line 2—2 of FIG. 1.

To locate the bearing balls 19 properly within the cable, a plurality of cages 23 are provided which consist of separate lengths of tubing loosely fitted about the core element 17 and within the helical wires 10. Each cage 23 has four uniformly spaced radial holes 25 formed in its wall to receive loosely a corresponding number of bearing balls 19. When the core element 17 is axially displaced during operation, the bearing balls 19 roll along its surface and therefore roll along the races 21 also. The cages 23 are abutted end-to-end throughout most of the cable length, allowing only enough freedom at the cable ends (FIG. 2) for the desired travel. Since the races 21 are helical in form, the bearing balls 19 roll in a helical path and impart limited rotation to each cage 23, thereby reducing the extent to which the cages are axially displaced during actuation of the core element 17.

Figure 4:
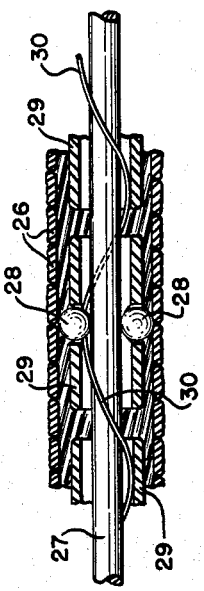
FIG. 4 is a fragmentary section similar to that of FIG. 3 of another embodiment of the new cable.

Referring to FIG. 4, a portion of a push-pull cable is shown which has bound helical wires 26 forming the same novel casing as that described above. Also, it includes a core element 27, bearing balls 28, and cages 29 similar to those of the previous embodiment. However, this cable further includes a spacing element 30 to hold the cages apart and prevent them from being extremely displaced longitudinally from their normal position. In some uses of the new cable, this may be a desirable feature. The spacing element 30 is a self-supporting resilient length of helical wire which is disposed loosely about the core element 27 and through each of the cages 29. The helix of the spacing element 30 differs in pitch from that of the helical wires 26 and thus differs also from that of the helical races. Therefore, when the bearing balls 28 roll along their helical races, they are eventually interfered with by a portion of the spacing element 30 and can proceed no further in that direction. By these means, cages 29 are restrained from extreme longitudinal displacement within the cable.

As mentioned previously, a push-pull cable according to the invention has the advantage that it can be bent in any direction and still be operable. The long helix of the wires in the casing provides self-support regardless of their cross section and, at the same time, defines helical bearing races for the bearing balls. All of these features are combined in a cable which requires a minimum of elements for its construction and is thus exceptionally economical.

I claim:

1. In a push-pull cable comprising a casing and a core element axially translatable therewithin in rolling engagement with a plurality of bearing balls inside said casing, an improvement in said casing which comprises a multiplicity of helically disposed wires bound together side-by-side throughout their length and defining the inner bore of said casing, and a plurality of helical bearing races formed throughout the length of the bore of said casing by adjoining pairs of said wires, said bearing balls in rolling engagement with said core element also being in rolling engagement with certain of said helical bearing races, whereby the bearing balls roll in a helical path as said core element is translated within said casing.

2. In a push-pull cable comprising a casing and a core element axially translatable therewithin in rolling engagement with a plurality of bearing balls inside said casing, an improvement in said casing which comprises a multiplicity of helically disposed wires bound together in tubular form side-by-side throughout their length and alone defining the inner bore of said casing, said wires having a lay at least fifteen times greater than the outer diameter of the tubular form which they define, and a plurality of helical bearing races formed throughout the length of the bore of said casing by valleys between adjoining pairs of said wires, said bearing balls in rolling engagement with said core element also being in rolling engagement with certain of said helical bearing races, whereby the bearing balls roll in a helical path as said core element is translated within said casing.

3. In a push-pull cable comprising a casing and a core element consisting of a single round wire axially translatable therewithin in rolling engagement with a plurality of bearing balls axially spaced by a plurality of separate cages inside said casing, an improvement in said casing which comprises a multiplicity of helically disposed round wires bound together in tubular from side-by-side throughout their length and alone defining the inner bore of said casing, said wires having a lay at least fifteen times greater than the outer diameter of the tubular form which they define, and a plurality of helical bearing races formed throughout the length of the inside surface of said casing by valleys between adjoining pairs of said round wires, said bearing balls in rolling engagement with said core element also being in rolling engagement with certain of said helical bearing races, whereby the bearing balls roll in a helical path as said core element is translated within said casing.

References Cited in the file of this patent

UNITED STATES PATENTS

| | | |
|---|---|---|
| 630,634 | Sundh | Aug. 8, 1899 |
| 1,930,272 | Huck | Oct. 10, 1933 |
| 2,372,204 | Herkert | Mar. 27, 1945 |
| 2,442,360 | Herkert | June 1, 1948 |
| 2,457,910 | McLaren et al. | Jan. 4, 1949 |
| 2,601,791 | Morse | July 1, 1952 |
| 2,706,494 | Morse | Apr. 19, 1955 |
| 2,841,029 | Richoux | July 1, 1958 |
| 3,063,303 | Cadwallader | Nov. 13, 1962 |

FOREIGN PATENTS

| | | |
|---|---|---|
| 863,208 | France | Jan. 2, 1941 |

UNITED STATES PATENT OFFICE
CERTIFICATE OF CORRECTION

Patent No. 3,135,132            June 2, 1964

Otto J. Bratz

It is hereby certified that error appears in the above numbered patent requiring correction and that the said Letters Patent should read as corrected below.

Column 3, line 39, strike out "with"; column 4, line 31, for "from" read -- form --.

Signed and sealed this 3rd day of November 1964.

(SEAL)
Attest:

ERNEST W. SWIDER            EDWARD J. BRENNER
Attesting Officer            Commissioner of Patents